(12) United States Patent
Zhang et al.

(10) Patent No.: US 8,861,107 B2
(45) Date of Patent: Oct. 14, 2014

(54) SYSTEMS AND METHODS FOR BURST DEMODULATION

(71) Applicant: LSI Corporation, San Jose, CA (US)

(72) Inventors: Xun Zhang, Westford, MA (US); Haitao Xia, San Jose, CA (US); Dahua Qin, Allentown, PA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/886,049

(22) Filed: May 2, 2013

(65) Prior Publication Data

US 2014/0233128 A1    Aug. 21, 2014

Related U.S. Application Data

(60) Provisional application No. 61/766,682, filed on Feb. 19, 2013.

(51) Int. Cl.
G11B 5/02 (2006.01)
G11B 5/09 (2006.01)
G11B 20/18 (2006.01)

(52) U.S. Cl.
CPC ..................................... *G11B 20/18* (2013.01)
USPC .............................................. 360/25; 360/53

(58) Field of Classification Search
None
See application file for complete search history.

(56) References Cited

U.S. PATENT DOCUMENTS

| | | | | |
|---|---|---|---|---|
| 6,052,244 A | * | 4/2000 | Haraguchi et al. | 360/46 |
| 6,055,118 A | * | 4/2000 | Du | 360/46 |
| 6,125,154 A | * | 9/2000 | Sutardja | 375/345 |
| 6,584,111 B1 | * | 6/2003 | Aweya et al. | 370/412 |
| 7,929,238 B1 | | 4/2011 | Vasquez | |
| 2011/0157737 A1 | | 6/2011 | Grundvig et al. | |
| 2012/0106607 A1 | | 5/2012 | Miladinovic et al. | |
| 2012/0124241 A1 | | 5/2012 | Yang et al. | |

OTHER PUBLICATIONS

U.S. Appl. No. 13/777,937, filed Feb. 26, 2013, Rui Cao, Unpublished.
U.S. Appl. No. 13/773,886, filed Feb. 22, 2013, Dahua Qin, Unpublished.
U.S. Appl. No. 13/491,135, filed Jun. 7, 2012, Xun Zhang, Unpublished.
U.S. Appl. No. 13/490,913, filed Jun. 7, 2012, Xun Zhang, Unpublished.

* cited by examiner

*Primary Examiner* — Daniell L Negron
(74) *Attorney, Agent, or Firm* — Hamilton DeSanctis & Cha

(57) ABSTRACT

A data processing circuit with flaw robust burst field demodulation includes a burst integration circuit operable to calculate burst integration results for a servo data burst field, a comparison circuit operable to determine whether an absolute value of the burst integration results falls outside a window, and an error indicating circuit operable to indicate that a media flaw has been detected when the absolute value of the burst integration results fall outside the window.

20 Claims, 4 Drawing Sheets

SYSTEMS AND METHODS FOR BURST DEMODULATION

CROSS REFERENCE TO RELATED APPLICATIONS

The present application claims priority to (is a non-provisional of) U.S. Pat. App. No. 61/766,682, entitled "Systems and Methods For Burst Demodulation", and filed Feb. 19, 2013 by Zhang et al, the entirety of which is incorporated herein by reference for all purposes.

FIELD OF THE INVENTION

Various embodiments of the present invention provide systems and methods for data processing, and more particularly to systems and methods for flaw robust burst field demodulation in servo data.

BACKGROUND

In a typical magnetic storage system, digital data is stored in a series of concentric circles or spiral tracks along a storage medium. Data is written to the medium by positioning a read/write head assembly over the medium at a selected location as the storage medium is rotated, and subsequently passing a modulated electric current through the head assembly such that a corresponding magnetic flux pattern is induced in the storage medium. To retrieve the stored data, the head assembly is positioned anew over the track as the storage medium is rotated. In this position, the previously stored magnetic flux pattern induces a current in the head assembly that can be converted to the previously recorded digital data. A servo control system is used to move the read/write head assembly across the storage medium as the medium is rotated, and may also control the rotation speed and therefore the frequency at which servo data is read. The read/write head assembly must be positioned correctly by the servo control system to properly read stored data. Patterns stored in various data fields of servo regions or servo wedges on the storage medium enable the servo control system to position the read/write head assembly. One such field is a position error signal (PES) burst field, typically grouped in four servo bursts that each include a series of transitions written at precise intervals and offsets from a data track centerline. The burst fields are demodulated and an analog peak detect is performed on the servo bursts to produce a position error signal indicating the direction in which the read/write head assembly should move to remain centered over the track. Flawscan is an important factory process to detect media defects, typically performed by detecting a signal field that has either a lower amplitude or larger channel metric, e.g., mean squared error compared to the ideal signal, than a pre-selected threshold. However, because the burst amplitude changes with respect to off-track position, flawscan is not supported in servo burst fields.

SUMMARY

Various embodiments of the present invention provide systems and methods for data processing, and more particularly to systems and methods for flaw robust burst field demodulation in servo data.

A data processing circuit is disclosed including a burst integration circuit operable to calculate burst integration results for a servo data burst field, a comparison circuit operable to determine whether an absolute value of the burst integration results falls outside a window, and an error indicating circuit operable to indicate that a media flaw has been detected when the absolute value of the burst integration results fall outside the window.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. This summary provides only a general outline of some embodiments of the invention. Additional embodiments are disclosed in the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals may be used throughout several drawings to refer to similar components. In the figures, like reference numerals are used throughout several figures to refer to similar components.

DETAILED DESCRIPTION OF THE INVENTION

Figure 1:
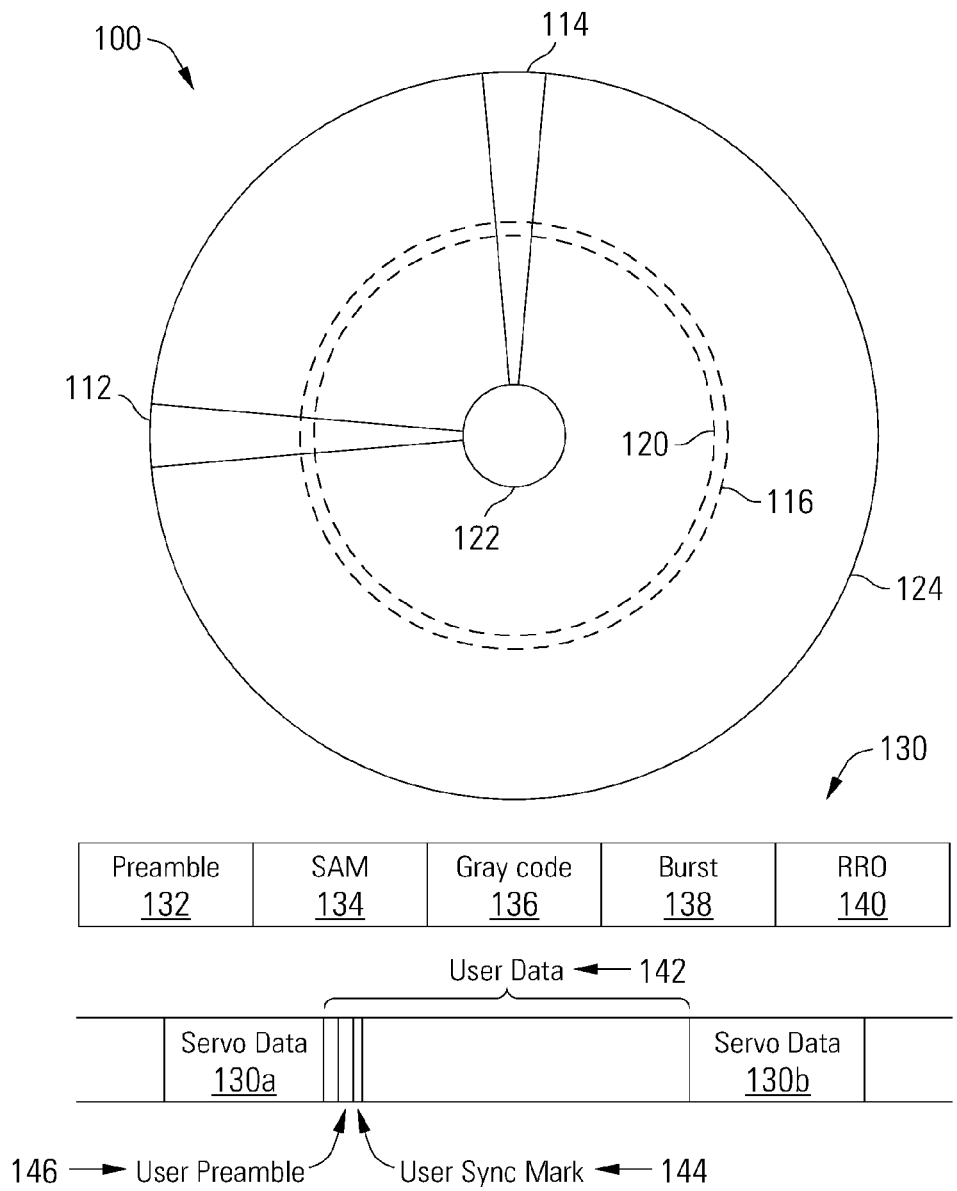
FIG. 1 is a block diagram of a magnetic storage medium and sector data scheme.

Various embodiments of the present invention provide systems and methods for flaw robust burst field demodulation in servo data, thereby facilitating flaw detection and correction in servo data burst fields to improve position error signal performance and improve positioning of a sensor such as a read/write head in relation to a storage medium while transferring information to and from the storage medium. A burst field in servo data can consist of a known pattern such as a sinusoidally varying data pattern in the servo data retrieved from a servo wedge on a storage medium such as a magnetic hard drive. A read/write head is positioned over the burst field, the data read from the burst field is demodulated to produce a position error signal assisting in positioning the read/write head correctly. The demodulation includes performing a burst integration on a half-cycle basis, and at the end of the burst, the ideal half-cycle integration result is estimated based on the absolute value of the half-cycle integration results. In some embodiments, the ideal half-cycle integration result is the mean of the half-cycle burst integration results, in some other embodiments, the ideal half-cycle integration result is the median of the half-cycle burst integration results. In other embodiments, other statistical measurements or algorithms are used to identify the ideal half-cycle integration result.

A threshold is used to identify media flaws or defects, which can be caused for example by decaying due to age. The threshold is defined as a percentage of the ideal half-cycle integration result, establishes a window around the ideal half-cycle integration result. In some embodiments, the lower bound of the window is at the ideal half-cycle integration result multiplied by the threshold, the upper bound of the window is at 2 minus the threshold, multiplied by the ideal half-cycle integration result. Any half-cycle burst integration result outside of the window is identified as a media flaw. Using this scheme, the threshold is independent from the absolute burst amplitude and thus is effective even when the read/write head is off-track.

The flaw-robust burst demodulator uses the half-cycle based burst integration as an indication of signal quality in the position error signal burst field. The threshold is defined as a percentage of the ideal half-cycle integration result, resolving the amplitude dependency problem of flawscan during the servo data burst field. In some embodiments, a gating threshold is used to prevent false detection and correction when the burst amplitude is too small, improving the robustness of the scheme and making it possible for field application. In these embodiments, if if the estimated ideal half cycle integration result is below the gating threshold, flawscan is disabled or skipped for the current burst.

In some embodiments, the flaw-robust burst demodulator is operable to correct or replace flawed half-cycle integration results, improving position error signal performance. In some of these embodiments, any flawed half-cycle integration results are replaced with the ideal half-cycle integration result and the half-cycle integration results for the burst are summed to provide the final burst integration result, or the position error signal used to assist in positioning the read/write head correctly.

Turning to FIG. 1, a magnetic storage medium 100 with servo wedges (e.g., 112, 114) containing servo data is depicted in accordance with one or more embodiments of the present invention. Two exemplary data tracks 116, 120 are shown, indicated as dashed lines. The tracks 116, 120 are segregated by servo data written within wedges 112, 114.

The servo wedges 112, 114 may extend from an inner diameter 122 to an outer diameter 124, each with a single wedge shape, and with the width increasing all the way from inner diameter 122 to outer diameter 124, or the shape of each wedge may be adjusted to avoid becoming too wide at outer diameter 124. Servo wedges 112, 114 may have any suitable shape and arrangement, and any number of servo wedges may be provided on storage medium 100. It should be noted that while two tracks 116, 120 and two servo wedges 112, 114 are shown, hundreds of wedges and tens of thousands of tracks may be included on a given storage medium.

The servo wedges 112, 114 include servo data 130 that is used for control and synchronization of a read/write head assembly over a desired location on storage medium 100. In particular, the servo data 130 generally includes a preamble pattern 132 followed by a servo address mark 134, followed by a Gray code 136, a burst field 138, and a repeatable run-out (RRO) field 140. It should be noted that a servo data set may have two or more fields of burst information. Further, it should be noted that different information may be included in the servo fields. Between the servo data bit patterns 130a and 130b, a user data region 142 is provided. User data region 142 may include one or more sets of data that are stored to storage medium 100. The data sets may include user synchronization information some of which may be used as a mark to establish a point of reference from which processing of the data within user data region 142 may begin processing.

In operation, storage medium 100 is rotated in relation to a sensor that senses information from the storage medium. In a read operation, the sensor would sense servo data from wedge 112 (i.e., during a servo data period) followed by user data from a user data region between wedge 112 and wedge 114 (i.e., during a user data period) and then servo data from wedge 114. In a write operation, the sensor would sense servo data from wedge 112 then write data to the user data region between wedge 112 and wedge 114, with location information in the user data region provided by a user sync mark 144 and a user preamble 146.

Figure 2:
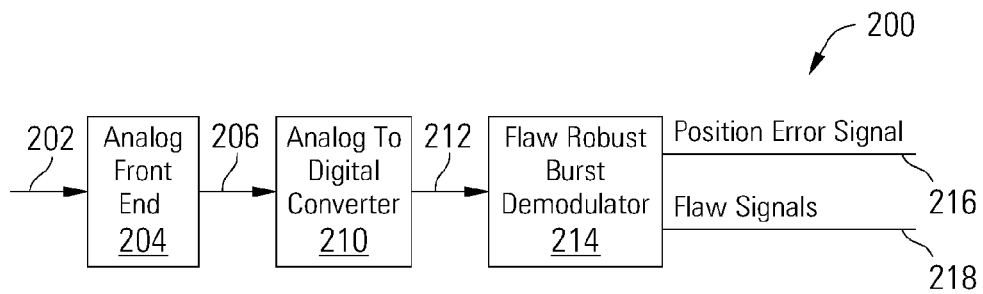
FIG. 2 is a block diagram of a servo channel with flaw-robust burst demodulation in accordance with some embodiments of the present invention.

Turning to FIG. 2, a block diagram depicts a servo channel 200 with a flaw-robust burst demodulator 214 in accordance with some embodiments of the present invention. The flaw-robust burst demodulator 214 is used to demodulate the burst data from burst field 138 to provide a position error signal 216, used in positioning the read/write head assembly over the center line of the current data track. The flaw-robust burst demodulator 214 also detects media flaws and optionally corrects for the flaws so that they do not degrade the position error signal 216.

Servo channel 200 includes an analog front end circuit 204 that receives an analog signal 202. Analog signal 202 may be, but is not limited to, a minute analog electrical signal derived from a read/write head assembly (not shown) that is disposed in relation to a storage medium (not shown). Based upon the disclosure provided herein, one of ordinary skill in the art will recognize a variety of sources from which analog input 202 may be derived. Analog front end circuit 204 processes analog signal 202 and provides a processed analog signal 206 to an analog to digital converter circuit 210. Analog front end circuit 204 may include, but is not limited to, an analog filter and an amplifier circuit as are known in the art. Based upon the disclosure provided herein, one of ordinary skill in the art will recognize a variety of circuitry that may be included as part of analog front end circuit 204.

Analog to digital converter circuit 210 converts processed analog signal 206 into a corresponding series of digital samples 212. Analog to digital converter circuit 210 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present inventions.

Digital samples 212 are provided to the flaw-robust burst demodulator 214, which performs burst integration on a half-cycle basis, establishes a window to identify half-cycle integration results which fall outside the window and are thus flawed, and can then either produce a position error signal based on the accumulated half-cycle integration results along with an indication of any flaws, or can also correct the flaws and produce a position error signal based on a corrected burst integration.

Figure 3:
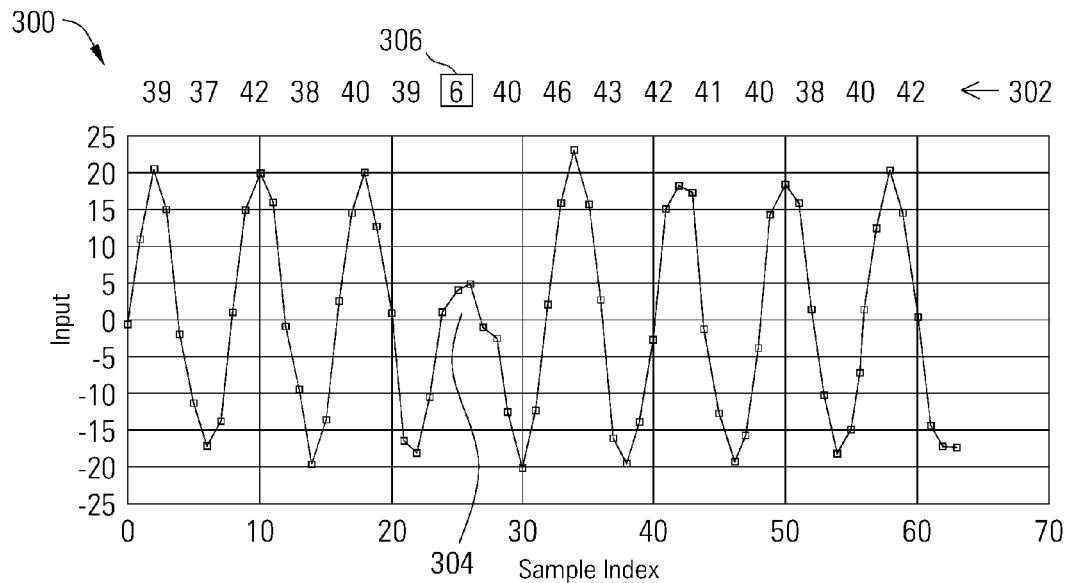
FIG. 3 is a graph of input data samples to a flaw-robust burst demodulator and corresponding half-cycle burst integration results in accordance with some embodiments of the present invention.

Turning to FIG. 3, a graph 300 of example input data samples to a flaw-robust burst demodulator is depicted along with corresponding half-cycle absolute burst integration results 302 in accordance with some embodiments of the present invention. Given a sinusoidal burst field, the input data may appear something like in FIG. 3. Near sample index 25, a media flaw has reduced the amplitude of a peak 304. This results in a half-cycle burst integration result 306 that is substantially lower than the other half-cycle burst integration results 302. Notably, the half-cycle burst integration results calculated in the flaw-robust burst demodulator may include both positive and negative results, for flaw detection the absolute value half-cycle burst integration results 302 are considered.

Figure 4:
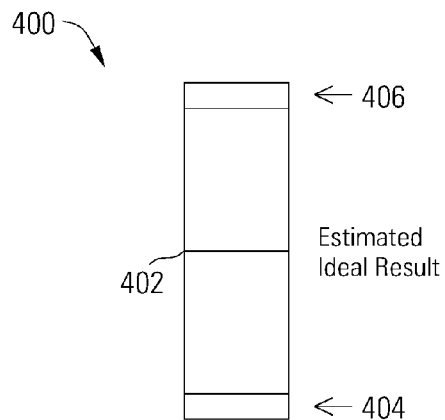
FIG. 4 depicts a window for detection of burst flaws in a flaw-robust burst demodulator in accordance with some embodiments of the present invention.

Turning to FIG. 4, a window 400 for detection of burst flaws in a flaw-robust burst demodulator is depicted in accordance with some embodiments of the present invention. The estimated ideal result 402 is calculated for a burst field based on the half-cycle burst integration results of that field. In some embodiments, the estimated ideal result 402 is a mean of the half-cycle burst integration results, in some other embodiments, the estimated ideal result 402 is a median of the half-cycle burst integration results, although other algorithms may be used for determining the value of the estimated ideal result 402. Given the example input of FIG. 3, the median of the half-cycle burst integration results 306 is 40, which is used in some embodiments as the estimated ideal result 402. The lower and upper boundaries 404 and 406 of the window 400 are based on a threshold expressed as a percentage of the estimated ideal result 402. In some embodiments, the threshold is programmable, such as but not limited to 0, ⅛, ¼, ½, where a value of 0 would disable the burst field flawscan feature.

If the threshold were programmed at ¼, the estimated ideal result is 40, the lower window boundary 404 is threshold*estimated ideal result and the upper window boundary 406 is (2-threshold)*estimated ideal result, the lower window boundary 404 would be ¼*40=10, and the upper window boundary 406 would be (2¼)*40=70. Because half-cycle burst integration result 306 is 6, which is less than 10, the half-cycle burst integration results 306 would be identified as having been read from a flawed location on the storage medium. Again, given the example input of FIG. 3, the accumulated integration for the burst, and thus the position error signal, would be 613 if the flawed half-cycle burst integration result 306 is included in the calculation, or 647 if the half-cycle burst integration result 306 were replaced by the estimated ideal result of 40, whereas the ideal value for the burst integration is 680 for this example. The flaw-robust burst demodulator detects the flaw and identifies the half-cycle of the burst field that contains the flaw, and if flaw correction is enabled, substantially compensates for the flaw.

Figure 5:
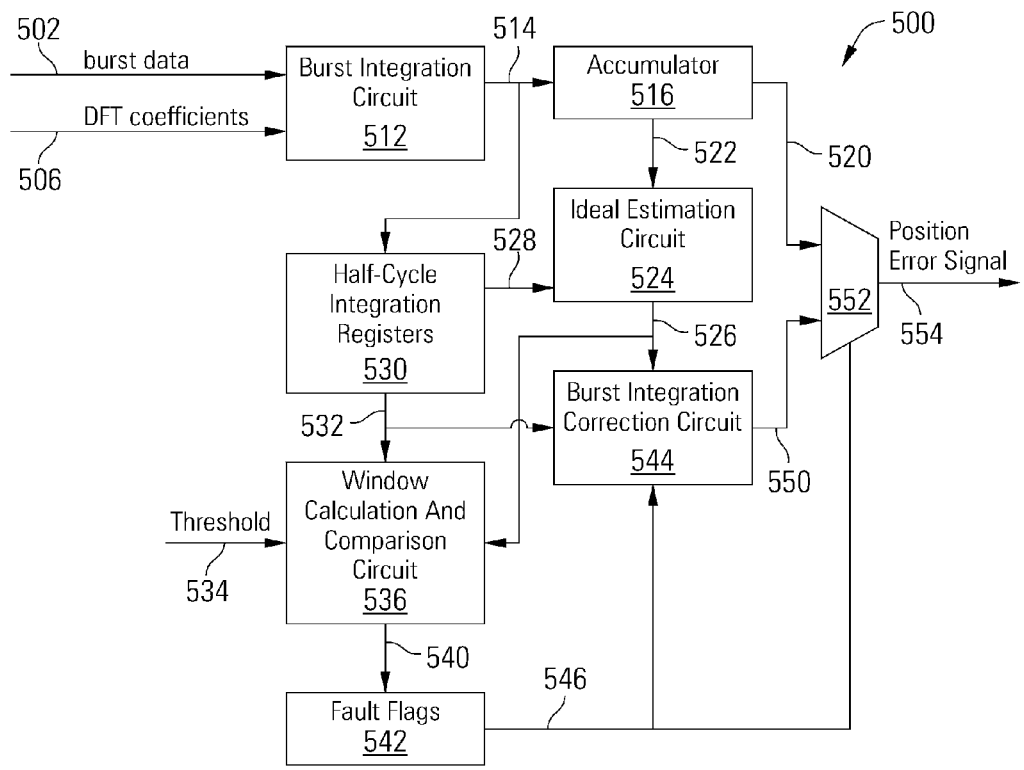
FIG. 5 is a block diagram of a flaw-robust burst demodulator in accordance with some embodiments of the present invention.

Turning to FIG. 5, a flaw-robust burst demodulator 500 is depicted in accordance with some embodiments of the present invention. The flaw-robust burst demodulator 500 is suitable for use in place of the flaw-robust burst demodulator 214 of FIG. 2. The flaw-robust burst demodulator 500 receives input data samples 502, which may be, but are not limited to, digital samples from an analog to digital converter corresponding to information from a servo data burst field. Based upon the disclosure provided herein, one of ordinary skill in the art will recognize a variety of sources from which input data samples 502 may be derived. The input data samples 502 are provided to a burst integration circuit 512, along with discrete Fourier transform (DFT) coefficients 506 of the given burst rate. For a sinusoidal burst pattern at a full rate, full wave, the discrete Fourier transform coefficients 506 are [0, 1, 0, −1], matching the zero-crossings and peaks in four samples of a sinusoidal wave. For a sinusoidal burst pattern at half rate, the discrete Fourier transform coefficients 506 are [0, 0.75, 1, 0.75] for the first half-cycle of the sinusoidal wave, then [0, −0.075, −1, −0.75] for the second half-cycle of the sinusoidal wave.

The burst integration circuit 512 is operable to apply any suitable servo data burst field integration algorithm. In some embodiments, the burst integration circuit 512 performs a dot product operation on the input data samples 502 and the discrete Fourier transform coefficients 506 to yield a burst integration result 514. In some embodiments, the burst integration circuit 512 can be considered to be a match filter, correlating the input data samples 502 and the discrete Fourier transform coefficients 506. Based upon the disclosure provided herein, one of ordinary skill in the art will recognize a variety of circuitry that may be included as part of burst integration circuit 512. The algorithm applied by the burst integration circuit 512 is performed on a half-cycle basis, calculating a new integration result every time a new half cycle of the burst pattern becomes available in input data samples 502. In some embodiments, the discrete Fourier transform coefficients 506 have the same number of bits as a half-cycle of the input data samples 502. The output of the burst integration circuit 512 is thus a half-cycle burst integration result 514.

The half-cycle burst integration result 514 is summed with burst integration results for other half-cycles in the current burst in accumulator 516. When the burst integration results for each half-cycle in the current burst are complete and have been summed in accumulator 516, the resulting accumulated burst integration result 520 can be immediately output as position error signal 554, thereby avoiding any additional latency due to flaw detection and optional correction.

The half-cycle burst integration result 514 is also stored in half-cycle integration registers 530, such as but not limited to 9-bit signed registers that are able to contain the maximum possible value for a half-cycle burst integration result. A separate register is provided in half-cycle integration registers 530 for each half-cycle of the burst field. In some embodiments, constraints are applied to limit the burst length.

Once the burst is complete and the half-cycle burst integration result 514 have been produced by burst integration circuit 512, the ideal burst integration result 526 is estimated in ideal estimation circuit 524. The ideal estimation circuit 524 calculates the ideal burst integration result 526 as the ideal value of the burst integration for a half-cycle, using any suitable algorithm, based on the accumulated burst integration results 522 or the stored half-cycle burst integration results 528 from half-cycle integration registers 530. In some embodiments in which the ideal burst integration result 526 is the mean of the absolute half-cycle burst integration results 528, the half-cycle burst integration results 528 are summed in accumulator 516 and then divided by the number of half-cycles to yield the mean value. In some other embodiments in which the ideal burst integration result 526 is the median of the absolute half-cycle burst integration results 528, the half-cycle burst integration result 514 for each half-cycle is sorted as it is stored in half-cycle integration registers 530. Each time the integration result from a new half-cycle becomes available, its absolute value is compared to the absolute value of the existing results in half-cycle integration registers 530, and inserted in front of the first smaller value, according to the following pseudocode:

```
For i=1:1:2*N
  j=1;
  while (j<i && abs(REG[i]<=REG[j]))
    j=j+1;
  temp=REG[i];
  for k=i:−1:j+1
    REG[k]=REG[k−1]
  REG[j]=temp;
``` where REG[i] refers to the i'th register in half-cycle integration registers 530.

After the integration and sorting is complete for each burst, the value in the N-th register in the array of half-cycle registers in half-cycle integration registers 530 is selected as the median and the ideal burst integration result 526, where N is the number of cycles in the burst field. As an example, if the half-cycle burst integration result for a 4-cycle burst is [81 20 80 75 85 84 79 82], the integration results and sorted integration results are as shown in the following table:

| Time index | Integration results | Sorted integration results |
|---|---|---|
| 4T  | [81] | [81] |
| 8T  | [81 20] | [81 20] |
| 12T | [81 20 80] | [81 80 20] |
| 16T | [81 20 80 75] | [81 80 75 20] |
| 20T | [81 20 80 75 85] | [85 81 80 75 20] |
| 24T | [81 20 80 75 85 84] | [85 84 81 80 75 20] |
| 28T | [81 20 80 75 85 84 79] | [85 84 81 80 79 75 20] |
| 32T | [81 20 80 75 85 84 79 82] | [85 84 82 81 80 79 75 20] |

The median value, to be used as the ideal burst integration result 526, is 81, taken from the sorted integration results in REG[N], where N is 4 for the 4-cycle burst.

A window calculation and comparison circuit 536 calculates the window boundaries based on the threshold 534 and the ideal burst integration result 526, where the threshold 534 is expressed as a percentage of the ideal burst integration result 526. If the threshold were programmed at ⅛, and the ideal burst integration result 526 were 81, and the window boundaries are calculated as previously disclosed, the lower window boundary is ⅛ *81 or 10, and the upper window boundary is (2⅛)*81 or 151 (if truncation is used rather than rounding).

The window calculation and comparison circuit 536 also compares the absolute value of each of the stored half-cycle burst integration results 532 from half-cycle integration registers 530 with the window boundaries to determine whether any of them fall outside the window. If so, the window calculation and comparison circuit 536 yields a fault signal 540 that sets a fault flag 542 corresponding to the faulty stored half-cycle burst integration result 532.

A burst integration correction circuit 544 is used in some embodiments to correct for flaws, substituting the ideal burst integration result 526 for any flawed stored half-cycle burst integration results 532 and re-summing the stored and corrected half-cycle burst integration results 532 to yield a corrected accumulated burst integration result 550. In some other embodiments, the flawed stored half-cycle burst integration results 532 are subtracted from the accumulated burst integration result 522 and the ideal burst integration result 526 is added in for each subtracted accumulated burst integration results 522 in burst integration correction circuit 544 to yield corrected accumulated burst integration result 550. A selector 552 or multiplexer is provided in some embodiments to select between the accumulated burst integration result 520 from accumulator 516 or the corrected accumulated burst integration result 550 from burst integration correction circuit 544 to output as the position error signal 554. The fault flags 542 are also available to external components as an indication and location of flaws found while demodulating the burst data, even if correction is disabled.

In some embodiments, burst field flawscan is disabled for a particular burst field in the flaw-robust burst demodulator 500 if the ideal burst integration result 526 is below a burst amplitude threshold or gating threshold. This helps to prevent false detection and correction of flaws when the burst amplitude is too small.

Figure 6:
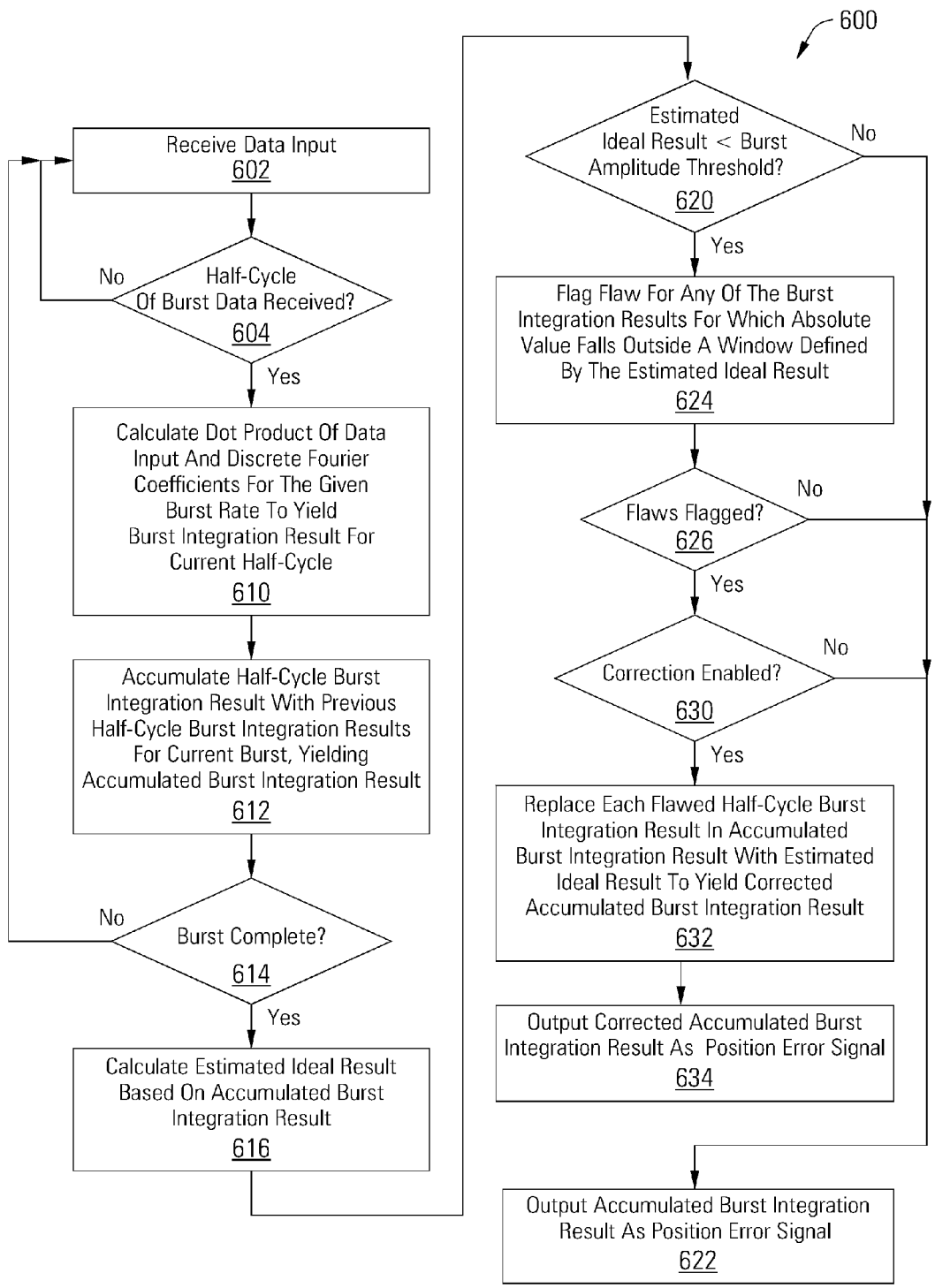
FIG. 6 is a flow diagram showing a method for flaw-robust burst demodulation in accordance with some embodiments of the present invention.

Turning to FIG. 6, flow diagram 600 shows a method in accordance with one or more embodiments of the present invention for flaw robust burst demodulation. Following flow diagram 600, data samples are received as a data input (block 602). A determination is made as to whether a half-cycle of burst data has been received (block 604), and if not, additional data is awaited (block 602). The dot product of the data input and discrete Fourier transform coefficients for the given burst rate is calculated to yield the burst integration result for the current half-cycle (block 610). The half-cycle burst integration result is accumulated with previous half-cycle burst integration results for the current burst, yielding the accumulated burst integration result (block 612). A determination is made as to whether the current burst is complete (block 614), and if not, additional data is awaited for processing (block 602).

When the current burst is complete, the estimated ideal result is calculated based on the accumulated burst integration result (block 616). A determination is made as to whether the estimated ideal result is less than the burst amplitude threshold (block 620). If so, the burst field flawscan is disabled for the current burst to prevent false detection and correction of flaws when the burst amplitude is too small. The accumulated burst integration result is output as the position error signal (block 622). Otherwise, any of the burst integration results for which absolute value falls outside a window defined by the estimated ideal result are flagged as having a flaw (block 624). The lower and upper boundaries of the window are based on a threshold expressed as a percentage of the estimated ideal result. In some embodiments, the threshold is programmable, such as but not limited to 0, ⅛, ¼, ½, where a value of 0 would disable the burst field flawscan feature.

A determination is made as to whether any flaws were flagged (block 626), and whether corrections are enabled (block 630). If both conditions are true, each flawed half-cycle burst integration result in the accumulated burst integration result is replaced with the estimated ideal result to yield a corrected accumulated burst integration result (block 632), and the corrected accumulated burst integration result is output as the position error signal (block 634). Otherwise, the accumulated burst integration result is output as the position error signal (block 622). Flaw flags are accessible in some embodiments to identify whether flaws were detected even if correction is not enabled.

Figure 7:
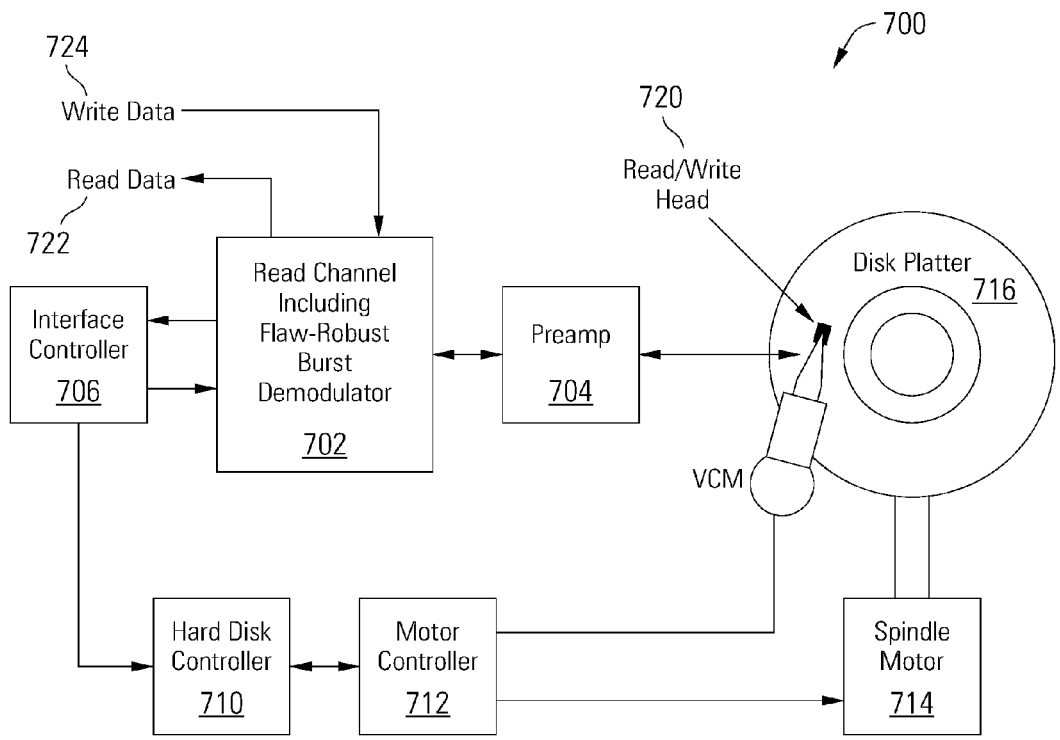
FIG. 7 depicts a storage system including a read channel with a flaw-robust burst demodulator in accordance with various embodiments of the present invention.

Turning to FIG. 7, a storage system 700 is illustrated as an example application of a data processing system with a flaw-robust burst demodulator in accordance with some embodiments of the present invention. The storage system 700 includes a read channel circuit 702 with a data processing system with a flaw-robust burst demodulator in accordance with some embodiments of the present invention. Storage system 700 may be, for example, a hard disk drive. Storage system 700 also includes a preamplifier 704, an interface controller 706, a hard disk controller 710, a motor controller 712, a spindle motor 714, a disk platter 716, and a read/write head assembly 720. Interface controller 706 controls addressing and timing of data to/from disk platter 716. The data on disk platter 716 consists of groups of magnetic signals that may be detected by read/write head assembly 720 when the assembly is properly positioned over disk platter 716. In one embodiment, disk platter 716 includes magnetic signals recorded in accordance with either a longitudinal or a perpendicular recording scheme.

In a typical read operation, read/write head assembly 720 is accurately positioned by motor controller 712 over a desired data track on disk platter 716. Motor controller 712 both positions read/write head assembly 720 in relation to disk platter 716 and drives spindle motor 714 by moving read/write head assembly 720 to the proper data track on disk platter 716 under the direction of hard disk controller 710. Spindle motor 714 spins disk platter 716 at a determined spin rate (RPMs). Once read/write head assembly 720 is positioned adjacent the proper data track, magnetic signals representing data on disk platter 716 are sensed by read/write head assembly 720 as disk platter 716 is rotated by spindle motor 714. The sensed magnetic signals are provided as a continuous, minute analog signal representative of the magnetic data on disk platter 716. This minute analog signal is transferred from read/write head assembly 720 to read channel circuit 702 via preamplifier 704. Preamplifier 704 is operable to amplify the minute analog signals accessed from disk platter 716. In turn, read channel circuit 702 decodes and digitizes the received analog signal to recreate the information originally written to disk platter 716. This data is provided as read data 722 to a receiving circuit. While processing the read data, read channel circuit 702 processes the received signal using a data processing system with a flaw-robust burst demodulator. Such a flaw-robust burst demodulator may be implemented consistent with that disclosed above in relation to FIGS. 1-5. In some cases, the data processing may be performed consistent with the flow diagram disclosed above in relation to FIG. 6. A write operation is substantially the opposite of the preceding read operation with write data 724 being provided to read channel circuit 702. This data is then encoded and written to disk platter 716.

It should be noted that storage system 700 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such storage system 700, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that storage system 700 may be modified to include solid state memory that is used to store data in addition to the storage offered by disk platter 716. This solid state memory may be used in parallel to disk platter 716 to provide additional storage. In such a case, the solid state memory receives and provides information directly to read channel circuit 702. Alternatively, the solid state memory may be used as a cache where it offers faster access time than that offered by disk platter 716. In such a case, the solid state memory may be disposed between interface controller 706 and read channel circuit 702 where it operates as a pass through to disk platter 716 when requested data is not available in the solid state memory or when the solid state memory does not have sufficient storage to hold a newly written data set. Based upon the disclosure provided herein, one of ordinary skill in the art will recognize a variety of storage systems including both disk platter 716 and a solid state memory.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the present invention provides novel systems, devices, methods and arrangements for flaw-robust burst demodulation. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing circuit comprising:
   a burst integration circuit operable to calculate burst integration results for a servo data burst field;
   a comparison circuit operable to determine whether an absolute value of the burst integration results falls outside a window; and
   an error indicating circuit operable to indicate that a media flaw has been detected when the absolute value of the burst integration results fall outside the window.

2. The data processing circuit of claim 1, wherein the burst integration circuit is operable to calculate the burst integration results for every half-cycle of data from the servo data burst field.

3. The data processing circuit of claim 1, wherein the servo data burst field comprises burst information read from a servo wedge on a magnetic storage disk.

4. The data processing circuit of claim 1, wherein the burst integration circuit is operable to perform a dot product operation on a data input derived from the servo data burst field and at least one discrete Fourier transform coefficient.

5. The data processing circuit of claim 1, wherein the burst integration circuit is operable to perform a match filter operation on a data input derived from the servo data burst field with at least one discrete Fourier transform coefficient.

6. The data processing circuit of claim 1, further comprising an accumulator operable to sum the burst integration results from the burst integration circuit over a particular burst and to produce a position error signal based on a value in the accumulator.

7. The data processing circuit of claim 1, further comprising an ideal estimation circuit operable to calculate an estimated ideal result based on absolute values of the burst integration results, wherein the estimated ideal results comprises a value selected from a group consisting of: a mean and a median.

8. The data processing circuit of claim 1, further comprising a plurality of registers operable to store each half-cycle burst integration result from the burst integration circuit.

9. The data processing circuit of claim 8, further comprising a correction circuit operable to replace each half-cycle burst integration result in the plurality of registers, for which the absolute value of the burst integration result falls outside the window, with an ideal estimated half-cycle burst integration result.

10. The data processing circuit of claim 9, wherein the correction circuit is further operable to calculate a corrected position error signal based on the half-cycle burst integration results in the plurality of registers.

11. The data processing circuit of claim 1, wherein the circuit is implemented as an integrated circuit.

12. The data processing circuit of claim 1, wherein the data processing circuit is implemented as part of a data storage device.

13. A method for demodulating a servo data burst field, comprising:
calculating a burst integration result for each half-cycle of the burst field;
accumulating the burst integration results for each half-cycle of the burst field to produce a position error signal;
determining whether an absolute value of the burst integration result for each half-cycle of the burst field is outside a window; and
flagging a media flaw when an absolute value of the burst integration result for any half-cycle of the burst field is outside the window.

14. The method of claim 13, further comprising calculating an estimated ideal result for the absolute values of the burst integration result for each half-cycle of the burst field as a function of the absolute values of the burst integration result for each half-cycle of the burst field, wherein the function is selected from a group consisting of: a mean and a median.

15. The method of claim 14, further comprising calculating the window based on the estimated ideal result and a threshold, wherein the threshold is expressed as a percentage of the estimated ideal result.

16. The method of claim 15, wherein a lower boundary of the window is calculated as the threshold multiplied by the estimated ideal result, and an upper boundary of the window is calculated as two minus the threshold, multiplied by the estimated ideal result.

17. The method of claim 13, further comprising producing a corrected position error signal by replacing any of the burst integration results for each half-cycle of the burst field for which the absolute value falls outside the window, with an estimated ideal result for the absolute value of each half-cycle of the burst integration result, and re-accumulating.

18. The method of claim 13, further comprising disabling the determining and the flagging for the burst field if an estimated ideal result for the absolute value of each half-cycle of the burst integration result is below a threshold.

19. The method of claim 13, wherein calculating a burst integration result for each half-cycle of the burst field comprises finding a dot product of data samples for the half-cycle and at least one discrete Fourier transform coefficient.

20. A storage device, comprising:
a storage medium;
a head assembly disposed in relation to the storage medium and operable to provide a sensed signal corresponding to a data set on the storage medium; and
a read channel circuit including a burst demodulator, comprising:
a burst integration circuit operable to calculate burst integration results for a servo data burst field in the data set;
a comparison circuit operable to determine whether an absolute value of the burst integration results falls outside a window; and
an error indicating circuit operable to indicate that a media flaw has been detected when the absolute value of the burst integration results fall outside the window.

* * * * *